Aug. 27, 1963     R. WILDBOLZ     3,101,513
BALE RASP
Filed April 21, 1961
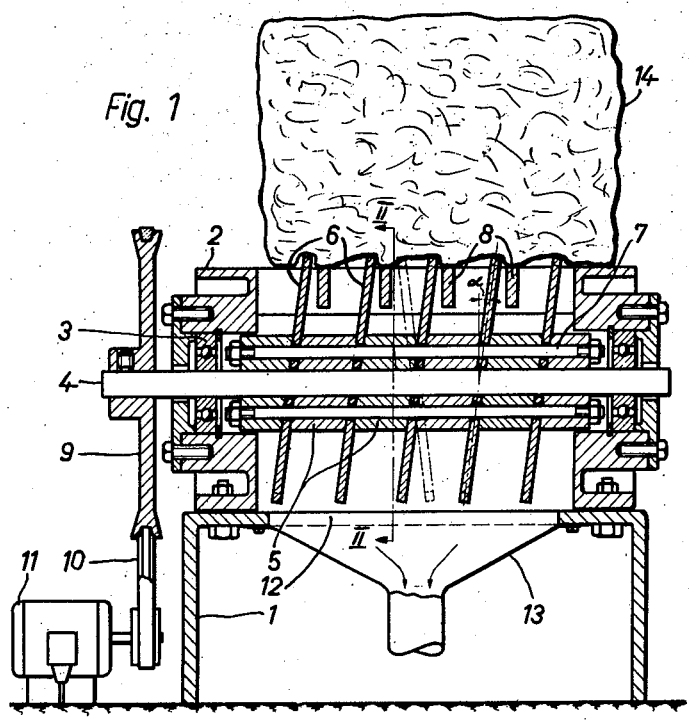
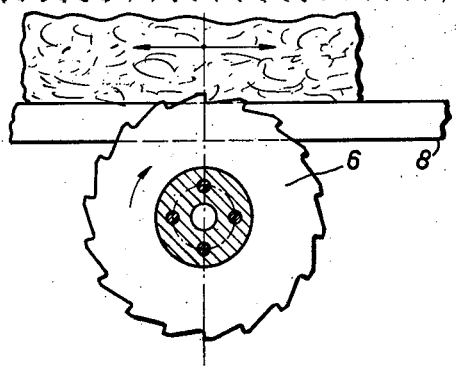
INVENTOR.
RUDOLF WILDBOLZ.
BY K. A. Meyr
ATTORNEY.

3,101,513
BALE RASP
Rudolf Wildbolz, Winterthur, Switzerland, assignor to Rieter Machine Works Ltd., Winterthur, Switzerland, a corporation of Switzerland
Filed Apr. 21, 1961, Ser. No. 104,724
Claims priority, application Switzerland Apr. 29, 1960
3 Claims. (Cl. 19—80)

The present invention relates to a bale rasp for mechanically opening pressed fibre bales, particularly cotton bales.

Conventional bale rasps are unsatisfactory because they work in a very limited area on the bales which are guided along a bar grate; this is particularly the case if thin saw-tooth discs are used as rasping elements.

It is an object of the present invention to provide a bale rasp which is more satisfactory than the conventional rasps because it works on a much greater area of the bale surface than the conventional bale rasps. This object is achieved by mounting a plurality of saw-tooth discs in spaced relation and in slanted position, i.e. at an angle other than 90°, on a rotatable shaft for rotation therewith, the discs extending between and beyond spaced parallel bars of a grate which supports the bale, the spacing of the bars and the angle of slant of the discs being such as to permit free rotation of the discs within the spaces between said bars.

The novel features which are considered characteristic of the invention are set forth with particularity in the appended claims. The invention itself, however, and additional objects and advantages thereof will best be understood from the following description of an embodiment thereof when read in connection with the accompanying drawing wherein:

FIG. 1 is a longitudinal sectional view of a bale rasp according to the invention.

FIG. 2 is a cross-sectional view of a portion of the bale rasp shown in FIG. 1, the section being made along line II—II of FIG. 1.

Referring more particularly to the drawing, numeral 1 designates a base supporting a frame 2 which is provided with bearings 3 for rotatably supporting a shaft 4. The latter carries a plurality of saw-tooth discs 6 spaced by spacers 5, the spacers and the discs being pressed together by bolts 7. The end surfaces of the tubular spacers 5 are slanted to hold the discs 6 in parallel relation and in a slanted position, i.e., at an angle α with respect to the normal to the longitudinal axis of the shaft. The frame 2 supports parallel, spaced grate bars 8 extending between the discs 6, the spacing depending on the angle α and the diameter of the discs. The upper edges of the bars 8 are slightly lower than the periphery of the discs 6. A belt pulley 9 is mounted on one end of the shaft 4 and is driven through a belt 10 by a motor 11. A funnel 13 connected to a suction-producing device, not shown, is mounted to the base 1 below the discs 6.

The aforedescribed bale rasp operates as follows: A cotton bale 14 is pushed on and longitudinally of the bars 8 either by hand or mechanically by means not shown to contact the saw-teeth extending upwardly beyond the bars 8 for tearing tufts out of the bale. Due to the slanted position of the saw-tooth discs the periphery of the latter wobbles between the positions shown in dash-dot lines and in solid lines in FIG. 1, i.e., almost in the entire space between the bars 8. The slowly advanced bales are therefore worked in the entire zone between the bars and production is considerably increased over that obtainable with a rasp wherein the saw-tooth discs are mounted normal to the shaft.

I claim:
1. A bale rasp for mechanically opening compressed fibre bales, comprising a grate having parallel spaced bars, a rotatable shaft disposed below said grate bars, and a plurality of saw-tooth discs mounted in slanted position on said shaft for rotation therewith, the peripheral portion of said discs extending between and beyond said bars during an entire revolution of said shaft.

2. A bale rasp for mechanically opening compressed fibre bales, comprising a grate having parallel, spaced bars, a rotatable shaft disposed below and in parallel relation to said grate and at a right angle to said bars, and a plurality of saw-tooth discs mounted in slanted position on said shaft for rotation therewith, each of said discs having a peripheral portion extending through one of the spaces between said bars and beyond said bars during an entire revolution of said shaft.

3. A bale rasp for mechanically opening compressed fibre bales, comprising a grate having parallel, spaced bars, a rotatable shaft disposed below and in parallel relation to said grate and at a right angle to said bars, and a plurality of saw-tooth discs mounted in slanted position on said shaft for rotation therewith, each of said discs having a peripheral portion extending through one of the spaces between said bars and beyond said bars, and the relation between the spacing between the grate bars and the angle of slant of said discs affording free rotation of said discs.

References Cited in the file of this patent
UNITED STATES PATENTS

| | | |
|---|---|---|
| 271,578 | Graner | Jan. 30, 1883 |
| 2,938,239 | Leineweber et al. | May 31, 1960 |